UNITED STATES PATENT OFFICE.

PHILIP INCH, OF WASHINGTON, DISTRICT OF COLUMBIA, ASSIGNOR OF EIGHT-FIFTEENTHS TO BERNARD N. BAKER, OF BALTIMORE, MARYLAND.

COMPOSITION OF METAL AND METHOD OF MAKING SAME.

SPECIFICATION forming part of Letters Patent No. 529,620, dated November 20, 1894.

Application filed June 20, 1894. Serial No. 515,142. (No specimens.)

*To all whom it may concern:*

Be it known that I, PHILIP INCH, a citizen of the United States of America, residing at Washington, in the District of Columbia, have invented certain new and useful Improvements in Compositions of Metal and Methods of Making the Same, of which the following is a specification.

My invention hereinafter described, is an improved alloy or composition of metal, the object being to provide a metal having special qualities for special purposes. The principal purpose which I have had in view is the sheathing of ships, to prevent fouling, but the composition which I have produced, is highly useful for other purposes, some of which are quite remote from the main object for which it was at first designed, and it may be useful for many purposes not now apparent.

My invention consists of a composition of tin and zinc, to which under some conditions a small proportion of aluminum may be added to harden the metal and increase its tensile strength.

It also consists of a method of making this composition.

The proportions which, by careful experiment, I have found best adapted to the main purpose which I have had in view, are as follows: 2.2143 pounds (two and two thousand one hundred and forty-three ten thousandths of a pound) of tin, one pound of zinc, and one half ounce of sal ammoniac. When aluminum is used I add about one penny-weight (avoirdupois). I do not confine myself to these proportions strictly, since I may somewhat vary the proportions, without materially changing the result and it is necessary to change the proportions for different purposes.

In preparing the composition for the bottom of ships, I roll it into sheets and properly secure such sheets so as to cover the whole submerged surface of the ship. The metal, though not liable to corrode when exposed to atmospheric influences, is acted upon when submerged by the water fresh or salt, the action being greater in salt water. This action of the water causes a slight and gradual exfoliation and this action may be made greater or less by varying the amount of zinc, and when barnacles, or any substance attaches itself to the surface of the metal, so exposed in the water, the slight chemical action between the water and the metal causes exfoliation of the metal and the attached barnacle, or other substance, then falls off, or is washed off, by the motion of the ship leaving the metal clean and bright.

In forming this composition it is better to first melt the zinc, and then pour into it the melted tin, finally adding the sal ammoniac and thoroughly stirring the mass. If aluminum is used I next add it in a melted form to the mass and stir it again. The sal ammoniac has the effect of purifying the composition and making it homogeneous.

In addition to its prime quality heretofore mentioned of keeping clean the bottom of ships, due to the exfoliation and the relative positive and negative magnetic conditions of the elements of the composition, it is suited for other purposes by reason of its resistance to corrosion. These purposes or uses are signs, gutters, spouting and the like and in fact all exposed work and it is also useful for culinary vessels where great heat is not required. I have found also that it possesses in a high degree the quality of taking ink like the magnesian limestone used in photolithography, and it may be used in the same manner as that stone, to transfer drawings, printing and the like.

The composition makes an excellent solder for itself, aluminum, copper, brass and iron with or without flux. When a flux is desired I use coal oil or spermaceti.

This metal composition may be cast, drawn, or rolled, with perfect facility.

I am aware that prior to my invention tin and zinc have been used in a composition for the manufacture of eyelets in the proportion of four parts of tin to one of zinc; but in my composition while I use these metals, the proportions are materially different and essentially so being in the proportion of two parts of tin to one of zinc, these proportions only varying a few per cent. in any event.

What I claim is—

1. The herein described composition of matter consisting of tin and zinc in the proportions of two parts of tin to one of zinc.

2. The herein described composition of matter consisting of tin, zinc and aluminum in the proportions of about two parts of tin, one of zinc and a pennyweight of aluminum to three pounds of the tin and zinc.

3. The method herein described consisting in melting one part of zinc, pouring into the molten zinc, two parts of molten tin, adding thereto a proportion of sal ammoniac and stirring the mass, substantially as described.

In testimony whereof I affix my signature in presence of two witnesses.

PHILIP INCH.

Witnesses:
HENRY E. COOPER,
F. L. MIDDLETON.